US009999874B2

(12) United States Patent
Jimenez Cruz et al.

(10) Patent No.: US 9,999,874 B2
(45) Date of Patent: Jun. 19, 2018

(54) PROCESS FOR OBTAINING HETEROGENEOUS ACID CATALYSTS BASED ON MIXED METAL SALTS AND USE THEREOF

(71) Applicant: INSTITUTO MEXICANO DEL PETROLEO, Mexico City (MX)

(72) Inventors: Federico Jesus Jimenez Cruz, Mexico City (MX); Celia Marin Rosas, Mexico City (MX); Luis Carlos Castaneda Lopez, Mexico City (MX); Rogelio Hernandez Suarez, Mexico City (MX); Javier Esteban Rodriguez Rodriguez, Mexico City (MX); Maria del Carmen Martinez Guerrero, Mexico City (MX); Florentino Rafael Murrieta Guevara, Mexico City (MX); Alicia del Rayo Jaramillo Jacob, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days. days.

(21) Appl. No.: 15/474,795

(22) Filed: Mar. 30, 2017

(65) Prior Publication Data
US 2017/0282163 A1  Oct. 5, 2017

(30) Foreign Application Priority Data

Mar. 31, 2016  (MX) .................. MX/a/2016/004132

(51) Int. Cl.
*B01J 27/182*  (2006.01)
*B01J 27/18*  (2006.01)
(Continued)

(52) U.S. Cl.
CPC .......... *B01J 27/1806* (2013.01); *B01J 21/18* (2013.01); *B01J 27/055* (2013.01);
(Continued)

(58) Field of Classification Search
CPC ................ B01J 27/1806; B01J 27/1808; B01J 27/1811; B01J 27/182; B01J 27/055;
(Continued)

(56) References Cited

U.S. PATENT DOCUMENTS 9,748,557 B2 * 8/2017 Holzapfel .............. H01M 4/136
2012/0295167 A1 * 11/2012 Holzapfel ............... C01B 25/45
429/319
2014/0121433 A1 * 5/2014 Cizeron .................... C07C 2/84
585/330

OTHER PUBLICATIONS

Predicting cetane number, kinematic viscosity, density and higher heating value of biodiesel from its fatty acid methyl ester composition, Luis Felipe Ramirez-Verduzco et al. Fuel 91 (2012), pp. 102-111.*

(Continued)

*Primary Examiner* — Patricia L. Hailey
(74) *Attorney, Agent, or Firm* — Dickinson Wright PLLC

(57) ABSTRACT

The present invention relates to heterogeneous acid catalysts comprising or consisting of mixed metal salts, of lithium and aluminum phosphates and sulfates, and combinations with metallic cations, such as magnesium, titanium, zinc, zirconium and gallium, to provide adequate Lewis acidity; organic or inorganic porosity promoters, such as polysaccharides; and agglomerates, such as clays, kaolin and metal oxides of the type $M_xO_y$, where; M=Al, Mg, Sr, Zr or Ti, and other metals of groups IA, IIA and IVB, x=1 or 2 and y=2 or 3, for the formation of particles. A process is disclosed for obtaining from the catalyst by the hydrolysis of aluminum lithium hydride with water and oxygenated solvent, such as an ether. The catalysts are used in batch reactor and con- (Continued)

tinuous flow systems in reactions that require moderate Lewis acidity, such as refining, petrochemical and general chemistry, including the transesterification of glycerides to produce alkyl esters.

22 Claims, 3 Drawing Sheets

(51) Int. Cl.
    *B01J 27/055*    (2006.01)
    *B01J 21/18*    (2006.01)
    *B01J 35/00*    (2006.01)
    *B01J 35/04*    (2006.01)
    *B01J 35/10*    (2006.01)
    *B01J 37/03*    (2006.01)
    *B01J 37/04*    (2006.01)
    *B01J 37/00*    (2006.01)
    *B01J 37/08*    (2006.01)
    *C11C 3/04*    (2006.01)

(52) U.S. Cl.
    CPC .......... *B01J 35/0006* (2013.01); *B01J 35/04* (2013.01); *B01J 35/1014* (2013.01); *B01J 35/1019* (2013.01); *B01J 35/1038* (2013.01); *B01J 35/1061* (2013.01); *B01J 37/0018* (2013.01); *B01J 37/036* (2013.01); *B01J 37/04* (2013.01); *B01J 37/086* (2013.01); *C11C 3/04* (2013.01)

(58) Field of Classification Search
    CPC .... B01J 27/18; B01J 35/0006; B01J 35/1014; B01J 35/1019; B01J 35/1038; B01J 35/1061; B01J 37/0018; B01J 37/036; B01J 37/04
    USPC .................................................. 502/208, 218
    See application file for complete search history.

(56) References Cited

OTHER PUBLICATIONS

"Prediction of the density and viscosity in biodiesel blends at various temperatures," Luis Felipe Ramirez-Verduzco et al. Fuel 90 (2011), pp. 1751-1761.*

* cited by examiner

PROCESS FOR OBTAINING HETEROGENEOUS ACID CATALYSTS BASED ON MIXED METAL SALTS AND USE THEREOF

RELATED APPLICATION

This application claims priority to MX/a/2016/004132, filed Mar. 31, 2016, which is hereby incorporated by reference.

FIELD OF THE INVENTION

The present invention relates to:
novel heterogeneous acid catalysts consisting of mixed metal salts, such as lithium and aluminum phosphates and sulfates and their combinations with metallic cations, such as magnesium, titanium, zinc, zirconium and gallium, which provide Lewis acidity; organic or inorganic porosity promoters, such as polysaccharides and agglomerates, such as clays, kaolin and metal oxides of the type $M_xO_y$, where M=Al, Mg, Sr, Zr or Ti, and other metals of groups IA, IIA and IVB, x=1 or 2 and y=2 or 3, for the formation of particles with geometry and established size, such as extrudates, spheres, trilobes and raschig rings, among others;
a process to obtain heterogeneous acid catalysts from a hydrogel or dispersion of lithium aluminum hydroxides in water and an oxygenated solvent, in which the hydrogel or dispersion is prepared from the hydrolysis of aluminum lithium hydride with water and a oxygenated or oxygen-containing solvent, such as an ether; and
the utilization of heterogeneous acid catalysts as a promoter of reactions that require moderate Lewis acidity in batch and continuous flow systems in various industries, such as petroleum refining, petrochemical and general chemistry. An application example is in the transesterification reaction of vegetable oils and/or animal fat to produce biodiesel, but its use is not limited to the production of this biofuel.

BACKGROUND OF THE INVENTION

In the article Advances in Heterogeneous Catalysis for Biodiesel Synthesis, Top Catal. 53, 721-736, 2010, Yan et al. describe both the limitations of homogeneous or first generation catalysts which act in the same reaction phase as the advantages of heterogeneous or second generation catalysts for the synthesis of biodiesel.

The limitations of the homogenous catalysts or so called "first generation" are:
a) their use is normally restricted to batch processing, and are primarily highly corrosive acids or bases.
b) the stages of the homogeneous biodiesel production process require long times and the processing is costly because of needed the steps such as: oil pretreatment, catalytic transesterification, fatty acid methyl ester (FAME) separation from glycerin, neutralization of the residues from the homogeneous catalyst, methanol distillation, washing of the FAME phase with water, and vacuum drying of the desired products.
c) it is impossible to reuse the homogeneous catalyst in reaction in new cycles because of its loss in the waste streams.
d) separation of the products requires a post-treatment with large volumes of water to neutralize the catalyst residues which generates waste water that must be treated before its disposal into the environment; and
e) the homogeneous catalyst is sensitive to free fatty acids (FFA) and water present in vegetable oils.

The advantages of heterogeneous catalysts or so-called "second-generation" are:
a) the catalyst is not lost during the reaction and can be recovered from the reaction medium and reused in several reaction cycles;
b) the performance in fixed bed reactors for continuous flow processes;
c) the post-treatment of product is not required, greatly reducing the ecological impact by avoiding the liquid wastes generated during the purification of the products; and
d) the microcrystalline structure in the catalyst surface is stable, which extends its useful life Some investigations have been focused on the study of transesterification basic catalysts in low-acid vegetable oils such as Jatropha oil and sunflower with high yields of biodiesel at non-severe reaction conditions. On the other hand, acidic catalysts are strongly recommended for use in the esterification and/or transesterification of vegetable oils with a higher degree of acidity and of animal fats, together with alkaline catalysts under conditions of moderate to high severity. Acid catalysts may be defined as oxygen carbonyl activators of the ester to increase its reactivity to the attack of the alcohol, typically methanol. These acid catalysts can be classified in those with Brönsted acid sites because they have carbonyl oxygen interactions with catalytic proton ($H^+$) sites and those with Lewis acid sites because of interactions of carbonyl oxygen with cationic ($M^+$) sites in the catalyst.

FIG. 1 describes the above explained, emphasizing experimental evidence showing the type of acidity on the surface of the catalyst by pyridine adsorption measured on an infrared spectrum which describes the interaction of a Lewis base on an acid surface. The interaction of the acidic sites on the surface with the pyridine molecule generates different bands. The characteristics for Brönsted acid sites appear at 1,545 $cm^{-1}$ and the characteristics for Lewis acid sites appear at 1,445 $cm^{+1}$ and the intermediate band at 1,490 $cm^{-1}$ for the two interactions:
Section (a) of FIG. 1 shows how the acid catalyst with Brönsted ($H^+$) sites acts on the triglyceride molecule by activating it for the transesterification reaction;
in section (b) of FIG. 1 illustrates how the acid catalyst with Lewis ($M^+$) sites acts on the triglyceride molecule by activating it for the transesterification reaction;
a catalyst having both types of sites is presented in section (c) of FIG. 1.

These interactions are also present in diglycerides and monoglycerides by activating themselves for transesterfication reactions with an alcohol, such as methanol. Thus, we can say that the catalysts of acidic nature that activate either the triglyceride, diglyceride or monoglyceride molecule, act as the promoter of the C=O ester.

Catalysts with Brönsted acidity, such as heteropolyacids (HPAs), have shown high catalytic activity, yield and conversion, in combination with monovalent cations, such as $Cs^+$. HPAs based on Nb and W supported on W—Nb, tungstated zirconia, tantalum and silver pentoxide have shown greater resistance to catalyst leaching, as described in the following bibliographic citations.

Katada N. et al., in Applied Catalysis A General, (2009), 363 (164: 168) studied solid acid catalysts derived from heteropolyacids (HPAs) with W and Nb. They found that under a calcination temperature of 773° K, W and Nb-based HPAs are supported on $WO_3$-Niobia ($WO_3$—$Nb_2O_5$) and are transformed into insoluble NPNbW/W—Nb formulations in the reaction mixture with high catalytic activity for the transesterification of triolein and ethanol to ethyloleate. The reaction rate is increased when methanol is used instead of ethanol. Due to the potential and catalytic stability during at least 4 days of reaction of these catalysts, the authors recommend carrying out the reaction in fixed bed and continuous flow reaction systems.

Shi et al., in Chemical Engineering & Technology (2012), 35 (2), 347-352 disclose that heteropolyacids (HPAs) were used as triglyceride transesterification catalysts, arguing both Brönsted and Lewis acidity properties. HPAs that are strong Brönsted acids, depending on their composition and the reaction medium, possess good thermal stability, high acidity and high oxidizing capacity and are water tolerant. Among HPAs, 12-tungstophosphoric acid ($H_3PW_{12}O_{40}$) is chosen because of its high activity since it shows a Keggin structure which is composed of a coordinated tetrahedral heteroatom of oxygen ($PO_4$), surrounded by 12 additions of atoms sharing coordinated octahedral oxygen atoms ($WO_6$) according to Oliveira C F et al. in Esterification of oleic acid with ethanol by 12-tungstophosphoric acid supported on zirconia. Appl Catal A-Gen 372: 153-161 (2010).

Heterogeneous catalysts of acidic nature such as those based on sulfated zirconia have been reported, in which it emphasized the fact that the carbonyl oxygen is activating by acid sites of Brönsted nature according to Rattanaphra et al., "Simultaneous Conversion of Triglyceride/Free Fatty Acid Mixtures into Biodiesel Using Sulfated Zirconia", Top Catal. 53: 773-782, 2010.

On the other hand, the esterification of palmitic acid with HPA catalyst was also carried out by Caetano et al. "Esterification of free fatty acids with methanol using heteropolyacids immobilized on silica. Catal Commun 9:1996-1999 (2008), using heterogeneous catalysts: Tungstophosphoric acid (PW), molybdophosphoric acid (PMo), and immobilized tungstosilicic acid (SiW) on silica by the sol-gel technique; from these prototypes the PW proved to be the best catalyst so it was studied with different concentrations of silica, obtaining 100% conversion of palmitic acid with a concentration of 0.042 g PW/g silica.

Alternatively, in the patent document reported by Tian et al., CN 103801282, "Solid base catalyst, and preparation method and application thereof", the use of an aluminum-Zn spinel catalyst ($ZnAl_xO_{1+1.5x}$ in which x=1.5-2.5) doped with La is described. The basic solid catalyst is used in the transesterification reaction of fatty acid esters with an alcohol to produce biodiesel; it is highly active and stable during the utilization, the active components are not lost.

In the patent document CN 103,752,297 "Zirconium-oxide catalyst for producing biodiesel, as well as a preparation method and application of zirconium-oxide catalyst" (2014) a zirconium oxide catalyst is claimed to produce biodiesel in a tubular reactor at a reaction temperature of 250-300° C., reaction pressure of 7 to 14 MPa and volume ratio of alcohol-oil of 0.5:1 to 7:1. The catalyst is characterized by containing zirconium oxide of 80-95 weight %, aluminum oxide of 2-18 weight %, 1 to 17% titanium dioxide, 5 to 25% sodium bicarbonate and 10 to 50% of sodium chloride and in the patent document CN 103,706, 384 "Preparation method of bio-diesel catalyst" (2014), there is provided a method of preparing a catalyst for the production of biodiesel in a continuous flow process in which the composition is $PO_4^{3-}/ZrO_2$ doped with rare earth metals such as La, Ce, Pr, Nd, etc.

The French Institute of Petroleum has developed an industrial technology called Esterfip-H™, which refers to a continuous process of transesterification where the reaction is promoted by a heterogeneous catalyst, which is a zinc aluminate ($ZnAl_2O_4$) spinel, which promotes the transesterification reaction, without loss of catalyst. The reaction is carried out at an operating temperature of 180-220° C. and pressure of 40-60 bar. The yields obtained are greater than 98%, with an excess of methanol. However, the raw material must have a free fatty acid content of less than 0.25% and a water content of less than 1,000 ppm. (Juan A. Melero et al., Critical Review, Heterogeneous acid catalysts for biodiesel production: current status and future challenges, Green Chem., 2009, 11, 1285-1308.)

In the patent document U.S. Pat. No. 5,908,946 (Stern R. et al., Inst. Français du Petrole, Process for the production of esters from vegetable oils or animal oils alcohols, 1999), for the production of esters of linear monocarboxylic acids with oils of 6 to 26 vegetable carbon atoms or oils of animal origin are reacted with monoalcohols having a low molecular weight, for example 1 to 5 carbon atoms, in the presence of a catalyst selected from zinc oxide, mixtures of zinc oxide and aluminum oxide, and the zinc aluminates corresponding to the formula: $ZnAl_2O_4$, x ZnO, and $Al_2O_3$ (with x and y being 0-2) and with a spinel-like structure, allowing the direct production in one or more steps, of an ester which can be used as fuel and pure glycerin. In order to process vegetable oil, severe operating conditions, temperatures of 170-250° C., pressures lower than 100 bar, with excess of the stoichiometric alcohol are considered, obtaining conversions of 80-85%, in the case of acid oil charges conditions are used operating conditions of 180-220° C., with pressures less than 1 bar.

Considering metal phosphates as metal catalysts for transesterification of biodiesel, Xie et al., in Bioresource Technology (2012), 119, 60-65, describe acid catalysts for transesterification of triglyceride esters based on 30 wt % $WO_3$ supported in $AlPO_4$ which were tested in batch reaction systems at 180° C. for 5 h and a methanol/oil ratio of 30:1 at a dose of 5% by weight catalyst.

Other transesterification catalysis systems consist of calcium phosphates from animal bone pyrolysis, which generates hydroxyapatite at 800° C. as described by Obadiah et al., in Bioresource Technology (2012), 116, 512-516.

Similarly, in the patent document CN 103,484,258 "Method for preparing biodiesel by using nano hydroxyapatite to catalyze triglyceride" (2014), a method is described for preparing biodiesel in the presence of a nanohydroxyapatite catalyst using from 0.5 to 3 weight % and operating at 800 to 300° C. for 2 to 10 h.

Yin et al. describe in Fuel (2012), 93, 284-287 the catalytic activity of $K_3PO_4$ at conditions of 220° C., a methanol-oil ratio of 24:1 and 1% of the catalyst resulting in a conversion of 95.6%.

Sodium phosphate has also been used as a transesterification catalyst for triglyceride esters in biodiesel production according to De Filippis et al., in Energy & Fuels (2005), 19 (6), 2225-2228

Hitherto, no lithium and aluminum phosphates and sulfates have been considered, in addition to their combinations with metallic cations, such as magnesium, titanium, zinc, zirconium and gallium, as heterogeneous phase catalysts with a Lewis nature both in reaction systems by batch and in continuous flow reaction systems. Neither has the synthesis of the same catalyst from hydrolysis products of lithium aluminum hydride and these hydrolysis products been considered as the source of lithium and aluminum for the formation of phosphates and sulfates from the reaction with the corresponding acid (Phosphoric acid or sulfuric acid), and other sources of metals such as magnesium, titanium, zinc, zirconium and gallium, from metal acetates.

SUMMARY OF THE INVENTION

It is therefore an object of the present invention to provide the synthesis of solid catalysts with Lewis acid sites, wherein the catalyst composition includes mixed metal salts, such as lithium and aluminum phosphates and sulfates, in addition to combinations with metal cations such as magnesium, titanium, zinc, zirconium and gallium.

Another object of the present invention is that the precursor of the mixed metal salts, such as lithium and aluminum phosphates and sulfates, in addition to their combinations with metal cations such as magnesium, titanium, zinc, zirconium and gallium, come from a material product of the addition of water and an oxygenated or oxygen-containing solvent, such as an ether, preferably tetrahydrofuran, diethyl ether or dimethoxyethane, on aluminum lithium hydride at temperatures of −20 to 60° C. with stirring from 0-10,000 rpm, generating a dispersion of hydroxides of lithium and aluminum in water and the oxygenated or oxygen-containing solvent, at a pH of 10 to 16, according to the reaction (1):

$$LiAlH_4 + 4H_2O \rightarrow LiOH + Al(OH)_3 + 4H_2 \quad (1)$$

Another object of the present invention provides a catalyst obtained from the addition of phosphoric acid or sulfuric acid to the mixture of lithium and aluminum hydroxides, the product of the hydrolysis of lithium aluminum hydride (reaction 1), to obtain compositions of lithium:aluminum, phosphorous or sulfur and the incorporation of metals such as titanium and magnesium as promoters of Lewis acid sites from their acetic acid salts A further object of the invention is to provide the catalysts where binders, such as clays, kaolin and metal oxides of the $M_xO_y$ type, are added, where M=Al, Mg, Sr, Zr or Ti, among other metals of groups IA, IIA and IVB, x=1 or 2 and y=2 or 3, for the formation of particles of shape and size, such as extrudates; and organic or inorganic porosity promoters of the catalyst, such as polysaccharides.

An additional object of these catalysts is their use in batch and continuous flow systems as promoters of reactions that require moderate Lewis acidity in various industries, such as petroleum refining, petrochemical and general chemistry. In one embodiment, the invention is directed to a method for the transesterification of vegetable oils and animal fats in the production of biofuels using the catalysts of the invention.

The foregoing and further objects of the present invention will be established more clearly and in detail in the following sections.

DETAILED DESCRIPTION OF THE INVENTION

The present invention relates to:
novel heterogeneous acid catalysts comprising or consisting of mixed metal salts, such as lithium and aluminum phosphates and sulfates. In addition, the invention includes combinations of the mixed metal salts with metallic cations, such as magnesium, titanium, zinc, zirconium and gallium, which provide adequate Lewis acidity; organic or inorganic porosity promoters, such as polysaccharides; and agglomerates or binders, such as clays, kaolin and metal oxides of the type $M_xO_y$, where M=Al, Mg, Sr, Zr or Ti, among other metals of groups IA, IIA and IVB, x=1 or 2 and y=2 or 3, for the formation of particles with geometry and established size, such as extrudates, spheres, trilobes and raschig rings, among others;

a process of obtaining the heterogeneous acid catalyst from a hydrogel or dispersion of lithium aluminum hydroxides in water and oxygenated or oxygen-containing solvent, which is obtained from the hydrolysis of aluminum lithium hydride with water and oxygenated solvent, such as an ether; and its use in batch and continuous flow systems as a promoter of reactions that require moderate Lewis acidity in various industries, such as refining, petrochemical and general chemistry.

Figure 1:
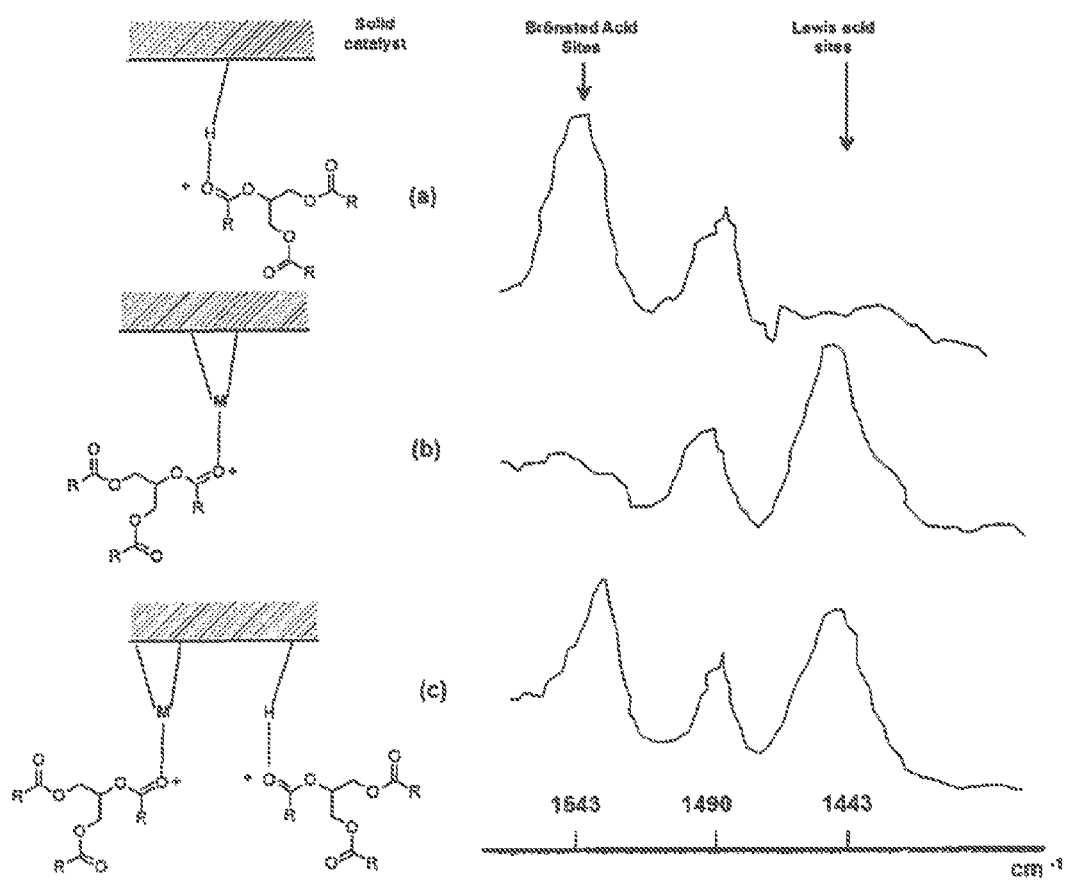
FIG. 1 shows the classification of acid catalysts according to Brönsted acid sites by having interactions of carbonyl oxygen with catalyst (H+) proton (H+) sites and those with Lewis acid sites due to interactions of oxygen Carbonyl with the cationic sites (M+).
Figure 2:
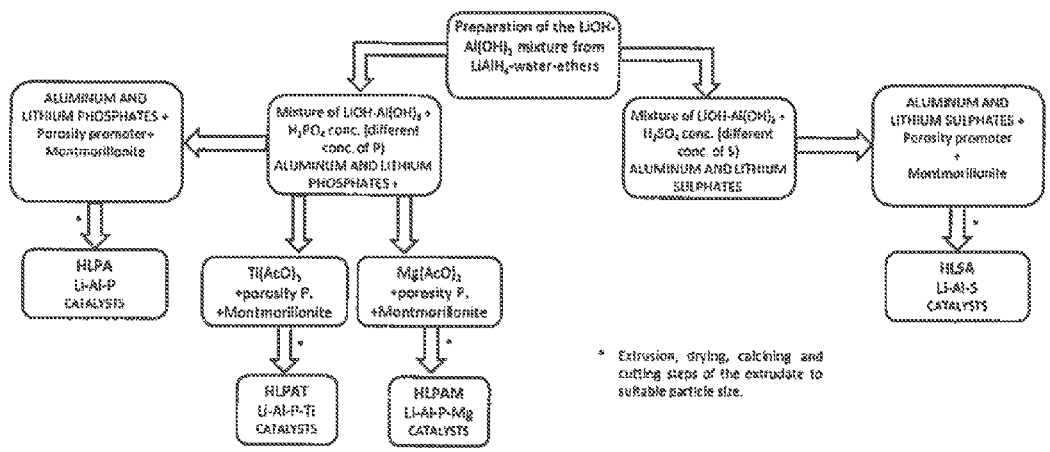
FIG. 2 is a flow chart for the preparation of heterogeneous acid catalysts based on mixed metal salts of the present invention.

FIG. 2 shows in general terms the flow diagram by which some of the heterogeneous acid catalysts preferred by the present invention are obtained:

Lithium and aluminum phosphates (HLPA series),
Lithium, aluminum and titanium phosphates (HLPAT series),
Lithium, aluminum and magnesium phosphates (HLPAM series), and
Lithium and aluminum sulfates (HLSA series).

The preparation of these catalysts comprises or consists of having a source of lithium and aluminum, such as a mixture of lithium and aluminum hydroxides or lithium aluminate, which are generated by the reaction of lithium aluminum hydride with water, forming a large quantity of hydrogen and the products described in reaction (1):

$$LiAlH_4 + 4H_2O \rightarrow LiOH + Al(OH)_3 + 4H_2 \quad (1)$$

The reaction (1) is highly exothermic ($\Delta H°_{298}$=−714 kJ/mol). It is also reported in the literature, (B B Baker, W M MacNevin, "Lithium Aluminum Hydride as Reagent for Determination of Water" Anal. Chem. 22: 364-365, 1950), that there is a possibility that the following reactions occur, an acid aluminate (reaction 2) or an aluminate as such (reaction 3).

$$2LiAlH_4 + 8H_2O \rightarrow 2LiOH + 2Al(OH)_3 + 8H_2 \quad (1)$$

$$LiOH + 2Al(OH)_3 \rightarrow LiH(AlO_2)_2 + 3H_2O \quad (2)$$

or $$LiAlH_4 + 2H_2O \rightarrow LiAlO_2 + 4H_2 \quad (3)$$

On the other hand, the lithium aluminate is formed by dissolving aluminum in lithium hydroxide, as a white precipitate, which by calcination generates $2Al_2O_3$—$Li_2O$ (Horan H A, Damiano J B "The Formation and Composition of Lithium Aluminate" J. Am. Chem. Soc., 57: 2434-2436, 1935).

The mixture of lithium and aluminum hydroxides, prepared above, is reacted with phosphoric acid or sulfuric acid at different concentrations to obtain lithium and aluminum phosphates or sulfates; in the reaction (4) is used phosphoric acid, and in the reaction (5) sulfuric acid is used to show these reactions:

$$4LiOH + 2Al(OH)_3 + 4H_3PO_4 \rightarrow Li_4Al_2P_4O_{15} + 11H_2O \quad (4)$$

$$4LiOH + 2Al(OH)_3 + 4H_2SO_4 \rightarrow Li_4Al_2S_4O_{17} + 9H_2O \quad (5)$$

These aqueous dispersions are formulated with organic or inorganic porosity promoters, such as polysaccharides, and binders such as clays, kaolin and metal oxides of the $M_xO_y$ type, where M=Al, Mg, Sr, Zr or Ti, among others, x=1 or 2 and y=2 or 3, for the formation of particles with geometry and size, such as extrudates, spheres, trilobes and raschig rings, among others; subsequently, by the extrusion, drying and calcination steps, the catalysts are produced with a formulation of Li—Al—P or Li—Al—S with Lewis type acidic nature. According to FIG. 2 the flow chart shows the procedure for the preparation of the catalysts labeled HLPA and HLSA. However, it is feasible for the lithium and aluminum phosphates and/or sulfates to incorporate another Lewis acidity promoting cation such as titanium or magnesium, by means of a solution of titanium acetate or magnesium acetate by a mixing step with agitation for 2-8 hours, preferably 2-3 hours. The titanium acetate, magnesium acetate, zinc acetate, zirconium acetate and/or gallium acetate can be mixed and reacted with the resulting lithium aluminum phosphate or sulfate.

In this regard, it is important to note that titanium and magnesium acetates are preferably prepared from the corresponding titanium and magnesium alkoxides, for example titanium isopropoxide or magnesium ethoxide; these alkoxides react with glacial acetic acid in stoichiometric proportions according to reactions (6) and (7):

$$[(CH_3)_2CHO]_4Ti + 4CH_3COOH \rightarrow (CH_3COO)_4Ti + 4(CH_3)_2CHOH \quad (6)$$

$$[CH_3CH_2O]_2Mg + 2CH_3COOH \rightarrow (CH_3COO)_2Mg + 2CH_3CH_2OH \quad (7)$$

The mixture obtained from the reaction with the titanium and magnesium salt generates precursors of the Li—P—Al—Ti, Li—P—Al—Mg, Li—S—Al—Ti and Li—S—Al—Mg respectively, that is formulated with porosity promoters, such as polysaccharides; and agglomerates or binders, such as clays, kaolin and metal oxides of the type $M_xO_y$, in which M=Al, Mg, Sr, Zr or Ti, among other metals of groups IA, IIA and IVB, x=1 or 2 and y=2 or 3 for obtaining particles with geometry and established size, such as extrudates, spheres, trilobes and raschig rings, among others; the catalysts with a formulation of Li—P—Al—Ti, Li—P—Al—Mg, Li—S—Al—Ti and Li—S—Al—Ti are produced by extrusion, drying and calcination stages. Mg, respectively, with Lewis type acidic nature. According to FIG. 2, the flow chart shows the formulation of the catalysts, which are described as HLPAT, HLPAM, HLSAT and HLSAM respectively.

Figure 3:
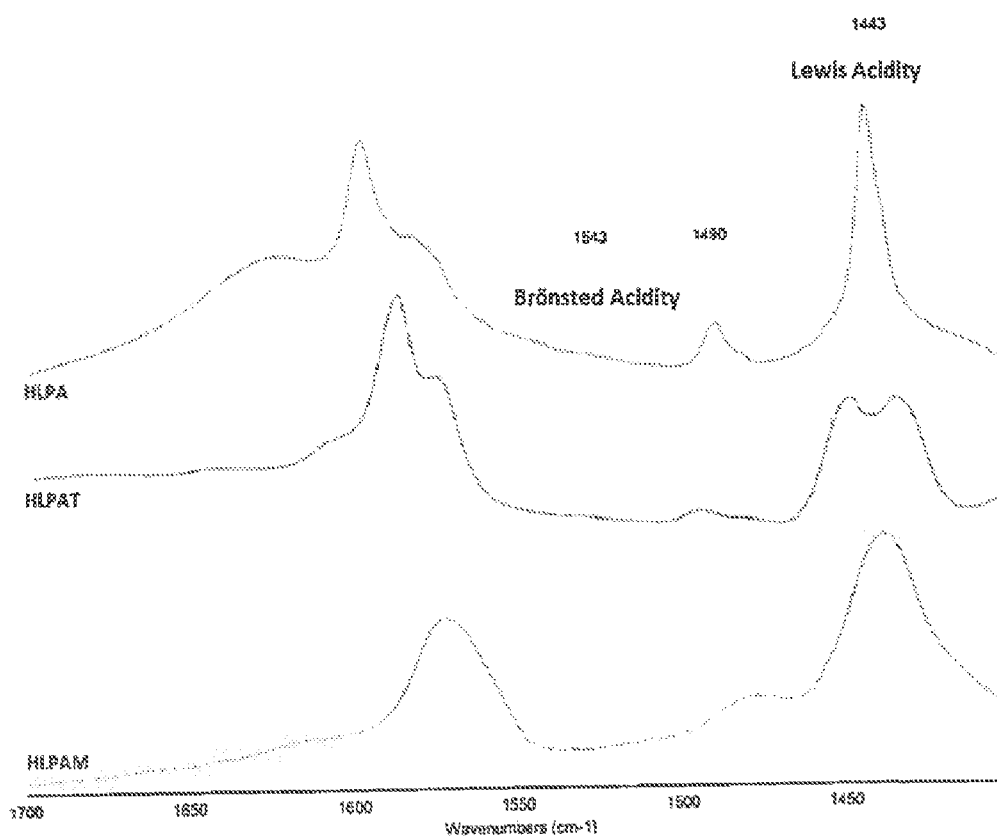
FIG. 3 shows the Lewis acidity sites of the mixed metal salt heterogeneous catalysts of the present invention, HLPA, HLPAT and HLPAM series determined by Fourier Transform Infrared Spectrometry (FTIR).

In this regard, a graph in FIG. 3 shows the Lewis acidity sites of the mixed metal salts heterogeneous acid catalysts of the present invention, HLPA, HLPAT and HLPAM series, respectively, as determined by Fourier Transform Infrared Spectrometry (FTIR).

The process of obtaining the heterogeneous acid catalysts of the present invention comprises the following steps:

a) obtaining a hydrogel from the aluminum hydrolysis of lithium hydride: preparation of the reaction system for the addition of water and oxygenated solvent, such as an ether, to lithium aluminum hydride under an inert atmosphere, at a temperature of −20 to 60° C. and stirring from 0 to 10,000 rpm, generating a dispersion of lithium aluminum hydroxides in water and oxygenated solvent, with a pH of 10 to 16;

b) the hydrogel or dispersion of lithium aluminum hydroxides in water and oxygenated solvent obtained in step a) is reacted with a corresponding phosphoric or sulfuric acid to obtain the mixed metal salt, preferably lithium aluminum phosphate or lithium aluminum sulfate, in the quantity necessary for the concentration of phosphorus or sulfur to be established;

c) the suspension obtained in step b) is homogenized by stirring until forming a crystalline solution;

d) to the crystalline solution obtained in step c) an acetate solution is added, where the acetate corresponds to the metal cation to be integrated into the mixed metal salt of lithium and aluminum, such as magnesium, titanium, zinc, zirconium or gallium acetate, maintaining stirring for 2 to 8 hours to homogenize;

e) an organic or inorganic porosity promoter, such as a polysaccharide, is added to the homogenized solution obtained in step d), while agitation is maintained until homogenized;

f) to the homogenized solution obtained in step e) a binder is added, such as clay, kaolin or metal oxide of the type $M_xO_y$, where M=Al, Mg, Sr, Zr or Ti, among other metals of the groups IA, IIA and IVB, x=1 or 2 and y=2 or 3, maintaining agitation until homogenization and subsequent aging and drying of the resulting paste; and g) the paste obtained in step f) is extruded; the extrudates are dried at room temperature for 16 to 20 hours; are fragmented to the desired size, preferably 3 to 4 cm in length; dried at 100-140° C. for 2 to 4 hours; are calcined at 250-500° C. for 2 to 4 hours; and finally they are crushed and sieved.

where:
the water used in step a) is preferably deionized water;
the oxygenated solvent employed in step a) is preferably an ether, such as tetrahydrofuran, diethyl ether or dimethoxyethane;
the ether used as the oxygenated solvent in step a) is preferably anhydrous tetrahydrofuran (THF);
the addition of water and oxygenated solvent in step a) is carried out as a pre-prepared mixture in a volume ratio of 5:1 to 1:5, preferably at a rate of 1 drop per second;
the volume ratio of water to the aluminum lithium hydride used in step a) is 3 to 20 parts of water per mole of lithium aluminum hydride;
the inert atmosphere in step a) is preferably generated using nitrogen gas ($N_2$), argon or helium;
the temperature used in step a) is preferably 0 to 5° C.;
the corresponding acid employed in step b) is preferably added at a rate of 1 drop per second;
the solution of the acetate to be added in step d) corresponding to the metal cation to be integrated into the mixed metal salt of lithium and aluminum is prepared just prior to use by reacting an alcohol, such as a metal isopropoxide or ethoxide with acid acetic acid while maintaining stirring for 2 to 6 hours;
the acetates preferably used in step d) are magnesium acetate and titanium acetate;
the agitation employed in step d) to homogenize preferably is maintained for 2 to 3 hours;
the polysaccharide used as the porosity promoter in step e) is preferably amylose-amylopectin (starch);
the clay used as a binder in step f) is preferably of the montmorillonite, kaolin, silica or alumina type;

the mixed metal salts besides their combinations with metallic cations preferably obtained are:
- Lithium and aluminum phosphates and sulfates (HLPA and HLSA series respectively),
- Lithium, aluminum and titanium phosphates and sulfates (HLPAT and HLSAT series respectively), and
- Phosphates and sulfates of lithium, aluminum and magnesium (HLPAM and HLSAM series respectively); and
  - the process of obtaining lithium and aluminum phosphates and sulfates (HLPA and HLSA series respectively) does not comprise step d).

The heterogeneous acid catalysts preferred by the present invention are preferably composed of mixed metal salts such as lithium and aluminum phosphates and sulfates with the following percentages of metals by weight of the catalyst: lithium up to 5 weight %, generally from 0 to 5 weight %, preferably from 0.1 to 3 weight %, and aluminum up to 15 weight %, generally from 0 to 15 weight %, preferably from 0.3 to 10 weight %; in addition to their combinations with metal cations in concentrations of up to 40 weight %, generally 0 to 40 weight % of the catalyst, preferably 0.2 to 30 weight %, such as magnesium, titanium, zinc, zirconium, gallium and silicon, which provide suitable Lewis acidity; organic or inorganic porosity promoters in concentrations of from 0.05 to 25 weight % of the wet base catalyst, up to 12 weight % and preferably from 0 to 12 weight %, such as polysaccharides; and binders in concentrations of 1 to 20 weight % of the catalyst, preferably 3 to 15 weight %, such as clays, kaolin and metal oxides of the $M_xO_y$ type, where M=Al, Mg, Sr, Zr or Ti, among other metals of the groups IA, IIA and IVB, x=1 or 2 and y=2 or 3, for the formation of particles with geometry and established size, such as extrudates, spheres, trilobes and raschig rings, among others; having the following properties: surface area of 10 to 180 $m^2/g$, preferably 30 to 80 $m^2/g$, pore volume of 0.1 to 0.5 $cm^3/g$, preferably 0.1 to 0.3 $cm^3/g$, and average pore diameter 100 to 200 Å, preferably 110 to 170 Å.

The physico-chemical properties of the heterogeneous acid catalysts of the present invention allow their use in batch reaction and continuous flow systems as promoters of reactions which require moderate Lewis acidity in various industries, such as petroleum refining, petrochemical and chemical.

EXAMPLES

Some practical examples of the present invention are described for a better understanding thereof, without limiting its scope.
- Example 1 describes the typical preparation of the lithium-aluminum hydroxide dispersion from the reaction of water with the aluminum lithium hydride;
- Example 2 describes the reaction of phosphoric acid with the dispersion of lithium and aluminum hydroxides to generate the lithium and aluminum phosphates, which are precursors of HLPA series catalysts;
- Examples 3 and 4 describe processes for incorporating lithium and aluminum phosphates, titanium and magnesium metals respectively (HLPAT and HLPAM series catalysts, respectively), starting from the corresponding acetate, and the method of preparing such acetates; and
- Example 5 describes the preparation of heterogeneous acid catalysts based on lithium aluminum sulfates (HLSA Series).

Example 1

Reaction of Aluminum Lithium Hydride with Water

A magnetic stirrer was placed in a 500 mL three-necked round flask with 24/40 outlet. The flask was previously washed, rinsed with acetone and deionized water and dried in an oven at 115° C. for 24 h. A refrigerant was connected to the central mouth portion of the flask, having a stopper (septa) at the upper end, in which a needle and a balloon filled with nitrogen gas ($N_2$) was inserted in order to generate an inert atmosphere in the system. In one of the side mouth of the flask, an addition funnel was placed using a glass stopper; in the other mouth of the flask a purge or vent plug was placed. The flask was placed in an ice bath with methanol and NaCl to avoid heating because of the exothermic reaction. Similarly, the arrangement of an inert atmosphere in the system was ensured by passing the nitrogen gas stream ($N_2$) contained in the balloon. 70 mL of freshly distilled anhydrous ether tetrahydrofuran (THF) was added to the flask thru the addition funnel; then agitation commenced. 14.3 g of lithium aluminum hydride (LAH) was placed in a 125 ml wide-mouth amber bottle with a screw cap and inert atmosphere (nitrogen stream), previously dried at 120° C. for 2 hours. Then, small portions (7 to 10 time) of anhydrous THF were added in the bottle aided by a plastic funnel. The stream nitrogen and stirring was maintained. Because it is an exothermic reaction, it is extremely important to ensure that the amount of ice is sufficient to cool the flask. CAUTION! BE CAREFUL THAT THE LAH POWDER DOES NOT FALL TO THE ICE BATH, because the reaction is very violent. The funnel and the flask walls were washed with 50 mL of anhydrous THF, dosed with a Pasteur pipette. Finally, the funnel was removed and the purge or vent plug was placed in its place. Sufficient ice was added to the vessel to cover the flask and maintain the temperature at 0-5° C. A mixture of deionized water:THF, in a volume ratio of 4:3, was prepared in a 100 mL graduated cylinder and placed in the addition funnel, located in one of the mouths of the flask, ensuring that the stopcock was closed. The addition of the deionized water:THF mixture was started at a rate of 1 drop per second (CAUTION! HYDROGEN, $H_2$, IS GENERATED). A white suspension was obtained in the first drop of the addition. The bath was maintained with sufficient ice and the continuous flow of $N_2$ through the system, allowing the gas mixture ($H_2$—$N_2$) exiting the purge to be drawn towards the hood. Stirring was maintained at speeds lower than 1 RPM. At the end of the addition of the deionized water:THF mixture, the deionized water was added to the addition funnel and added to the LAH by dropping the amount and time shown in Table No. 1. It is important to emphasize that the addition of water must be slow, because it is an exothermic reaction and $H_2$ is generated.

TABLE NO. 1

Addition of deionized water to aluminum lithium hydride (LAH).

| Addition number | Deionized water Volume (mL) | Addition time (min) |
|---|---|---|
| 1 | 50 | 60 |
| 2 | 50 | 30 |
| 3 | 50 | 20 |
| 4 | 10 | 10 |

As the reaction progressed, the gray particles disappeared and the appearance of the reaction mixture turned white. At the end of the reaction, it was ensured that there was no LAH (dark gray) to continue the reaction, and then the refrigerant was removed as well as the addition funnel and the vent. The mixture obtained was a white dispersion of lithium and aluminum hydroxides in water and tetrahydrofuran, with a pH of 14, which was stored in a wide-mouth bottle, tightly closed and sealed for later use.

Example 2

Preparation of Heterogeneous Acid Catalysts Based on Lithium and Aluminum Phosphates (HLPA Series)

Ortho-phosphoric acid was slowly added dropwise in a 100-mL beaker containing 20 g of the lithium aluminum hydroxide dispersion in water and tetrahydrofuran obtained in Example 1, the amount of the ortho-phosphoric acid was the necessary for having a concentration of 0.55% of P, on wet basis. The suspension was homogenized, first with a spatula and then with a magnetic stirrer to form a crystalline solution, then 4 g of a starch gel was prepared and added. The preparation of the starch gel was as follows: to 1 g of starch contained in a glass beaker, 30 mL of deionized water was added; the mixture was heated at 70° C. for 30 min and taken to room temperature.

After adding the starch gel, 8.5 g of montmorillonite K 10 were added with manual stirring in portions of 8-10 fold. The mixture was stirred with a spatula until completely homogeneous and with little moisture. The paste was extruded and the extrudates were put in stainless steel trays to allow them to dry at room temperature for 18 h. Subsequently, the extrudates were fragmented to sizes of 3-4 cm in length and placed in a porcelain cap of 12 cm in diameter to be dried at 120° C. for 3 h; then, they were calcined at 350° C. for 4 h. Finally, the calcined extrudates were crushed and sieved for obtaining between 30 to 40 mesh (0.42 to 0.59 mm) particle sizes. The loaded density of the particles that are retained in the 40 mesh is determined for evaluation in a bank reactor, which is 0.5241 g/cm$^3$.

The extruded catalyst prepared with metal/P weight ratio, on wet basis, of 1.2 Li/P and 4.7 AL/P was named as HLPA-16 heaving the following properties: surface area of 137 m$^2$/g, pore volume of 0.25 cm$^3$/g and average pore diameter of 73.4 Å.

Example 3

Preparation of Heterogeneous Acid Catalysts Based on Lithium, Aluminum and Titanium Phosphates (HLPAT Series)

For the preparation of this series of catalysts, it is necessary to maintain stable titanium avoiding the hydrolysis, for it is required to have a solution of titanium acetate since it is more stable than an alkoxide.

Preparation of the Titanium Acetate Solution 4 g of titanium isopropoxide was weighed into a 100 mL beaker and 16 g of glacial acetic acid was added while maintaining magnetic stirring for 10 min to obtain a crystalline solution. The reaction was carried out as follows:

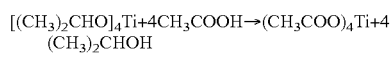

Catalyst.

20 g of the dispersion of lithium aluminum hydroxide in water and tetrahydrofuran obtained in Example 1, were weighed into a 100 mL beaker, and 3.8 mL of ortho-phosphoric acid was slowly added into dropwise.

The suspension was homogenized with stirring and the previously prepared crystalline solution of titanium acetate was added. While maintaining continuous stirring, more orthophosphoric acid was added into dropwise to obtain a phosphorus concentration of 4.2 wt % on wet basis, a 20 mL aliquot was taken in a porcelain cap and 5 g of montmorillonite K 10 was added with stirring manual. The starch gel, prepared as in Example 2, was added into and manually agitated with the spatula. The remaining montmorillonite was added in portions of 8 to 10 times. The mixture was homogenized by stirring with a spatula until the mixture was observed without moisture.

The paste was extruded; the extrudates were dried at room temperature for 18 h, fragmented into sizes 3-4 cm in length, placed in a porcelain cap of 12 cm in diameter, dried at 120° C. for 3 h, and calcined at 350° C. for 4 h. The calcined extrudates were crushed and sieved to obtain particles sizes between 30-40 mesh for its evaluation in a bench reactor; the loaded density was 0.8991 g/cm$^3$.

The extrudate catalyst prepared with metal/P weight ratio, on wet basis, of 0.2 Li/P, 0.06 AL/P and Ti/P of 0.05 was named as HLPAT-1 and it showed the following properties: surface area of 94.8 m$^2$/g, pore volume of 0.15 cm$^3$/g and average pore diameter of 62.7 Å.

Example 4

Preparation of Heterogeneous Acid Catalysts Based on Lithium, Aluminum and Magnesium Phosphates (HLPAM Series)

For the synthesis of this series of catalysts, it is necessary to prepare a solution of magnesium acetate.

Preparation of Magnesium Acetate Solution 1.6 g of magnesium ethoxide were weighed into a 100 mL beaker, and 10 g of glacial acetic acid were added to the flask standing in an extractor hood. The magnetic stirring was maintained for 3 h to obtain an amber solution. The reaction was carried out as follows:

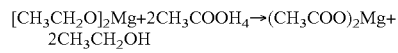

Catalyst.

Into a 100 mL beaker, 20 g of the lithium aluminum hydroxide dispersion in water and tetrahydrofuran obtained in Example 1 were weighed and 0.4 mL of ortho-phosphoric acid was slowly added dropwise to obtain a phosphorus concentration of 0.8 wt. %. The slurry was homogenized with a spatula; then, the magnesium acetate solution in the form of prepared lumps was added maintaining the stirring for 3 h to homogenize and obtain a yellow solution. 4 g of the starch gel, prepared as in Example 2, was homogenized and 20 g of montmorillonite K 10 was added stirring with a spatula. The mixture was homogenized and then dried with a cold air gun for 1 h to remove excess moisture from the paste, the paste was allowed to age for 12 h to obtain a paste of suitable consistency to extrude. The extrudates were placed in stainless steel trays, dried at room temperature for 18 h, fragmented into 3-4 cm lengths, placed in a porcelain cap, dried at 120° C. for 3 h, and calcined at 480° C. for 4 h; then they were crushed and sieved through mesh numbers 30 and 40. The density was determined using the particles retained in the 40 mesh, which was 0.7300 g/cm$^3$.

The catalyst had a metal/P weight ratio of 1.19 Li/P, 4.6 AL/P and Mg/P of 2.1, and was named as HLPAM-3. It showed the following properties: surface area of 52.1 m$^2$/g, pore volume of 0.20 cm$^3$/g and average pore diameter of 153.8 Å.

Example 5

Preparation of Heterogeneous Acid Catalysts Based on Lithium Aluminum Sulfates (HLSA Series)

In a 100 mL beaker containing 20 g a dispersion of the lithium aluminum hydroxide in water and tetrahydrofuran, obtained in Example 1, sulfuric acid was slowly added dropwise in the amount necessary for the S concentration of 3.4% wet basis. The suspension was stirred and homogenized with a spatula and then, it was stirred with the aid of a magnetic stirrer to provide a crystalline solution. 4.4 g of the starch gel was added to the solution; the gel starch was prepared as follows: to 1 g of starch contained in a glass flask, 30 mL of deionized water was added, the mixture was heated to 70° C. for 30 min and allowed to cool to room temperature.

After the starch gel was added, 12.5 g of montmorillonite K 10 were added with manual stirring in 8-10 fold portions. The mixture was stirred with a spatula until completely homogeneous and the mixture was observed with little moisture. The paste was extruded, and the extrudates were placed in stainless steel trays to allow them to dry at room temperature for 18 h. Subsequently, the extrudates were fragmented to 3-4 cm sizes in length, and placed in a porcelain cap of 12 cm in diameter to be dried at 120° C. for 3 h and calcined at 350° C. for 4 h; at the end, they were crushed and sieved to obtain particle sizes between 30 to 40 mesh (0.42 to 0.59 mm). The compact density of the particles retained in the 40 mesh was determined for evaluation in a bench reactor, which was 0.6973 g/cm$^3$.

The extrudate catalyst prepared with metal/P weight ratio on wet basis of 0.08 Li/S and 0.32 AL/S was named as HLSA-4, and it showed the following properties: surface area of 127 m$^2$/g, pore volume of 0.26 cm$^3$/g and average pore diameter of 83.4 Å.

What is claimed is:

1. Heterogeneous acid catalysts comprising mixed metal salts of lithium and aluminum phosphates and/or sulfates and an optional metal cation with the following metal weight percentages of the catalyst:
   lithium up to 5 weight % and aluminum up to 15 weight %; in combinations with metal cations in amounts of up to 40 weight % of the catalyst, where said cations are selected from the group consisting of magnesium, titanium, zinc, zirconium, gallium and silicon;
   organic or inorganic porosity promoters in concentrations of 0.05 to 25 weight % on wet base catalyst, where said organic porosity promoters are polysaccharides;
   binders in concentrations of 1 to 20 weight % of the catalyst, said binders selected from the group consisting of clays, kaolin and metal oxides having the formula MxOy,
   where M=Al, Mg, Sr, Zr or Ti, X=1 or 2 and y=2 or 3, for the formation of particles of shape and size, in the form of extrudates, spheres, trilobules and raschig rings;
   the catalyst having a surface area of 10 to 180 m2/g, pore volume of 0.1 to 0.5 cm3/g, and average pore diameter 100 to 200 Å.

2. Heterogeneous acid catalysts according to claim 1, where the mixed metal salts in addition to their combinations with said metal cations are selected from the group consisting of:
   a) Phosphates and sulfates of lithium and aluminum;
   b) Phosphates and sulfates of lithium, aluminum and titanium; and
   c) Phosphates and sulfates of lithium, aluminum and magnesium.

3. Heterogeneous acid catalysts according to claim 1, wherein
   the heterogeneous acid catalysts are composed of mixed metal salts with the following metal percentages by weight of the catalyst: lithium from 0.1 to 3 weight % and aluminum from 0.3 to 10 weight %; in addition to combinations with metallic cations, selected from the group consisting of titanium, magnesium and silicon, in concentrations of 0.2 to 30 weight %; porosity promoters in concentrations of 0 to 12 weight % of the wet base catalyst; and binders, comprising clays in concentrations of 3 to 15 weight % of the catalyst.

4. Heterogeneous acid catalysts according to claim 1, wherein
   the polysaccharide used as the porosity promoter is an amylose-amylopectin starch.

5. Heterogeneous acid catalysts according to claim 1, wherein
   the clays used as binders are montmorillonite.

6. Heterogeneous acid catalysts according to claim 1, wherein
   the heterogeneous acid catalysts preferably have the following properties: surface area of 30 to 80 m2/g, pore volume of 0.1 to 0.3 cm3/g, and average pore diameter of 110 to 170 Å.

7. A process for producing the heterogeneous acid catalysts of claim 1, comprising the following steps:
   a) Preparing a hydrogel by the hydrolysis of aluminum lithium hydride, by the addition of water and an oxygenated or oxygen-containing solvent in an inert atmosphere, at temperature of −20 to 60° C. and stirring from 0 to 10,000 rpm, generating a dispersion of lithium aluminum hydroxides in water and oxygenated or oxygen-containing solvent, at a pH of 10 to 16;
   b) reacting the dispersion of lithium aluminum hydroxides in water and an oxygenated or oxygen-containing solvent obtained in step a) with a corresponding acid to obtain the mixed metal salt, of lithium aluminum phosphate or sulfate, where the acid is present in an amount to obtain a concentration of phosphorus or sulfur;
   c) homogenizing the resulting suspension obtained in step b) by stirring to obtain a crystalline solution;
   d) adding an acetate solution corresponding to a metal cation to be integrated into the mixed metal salt of lithium and aluminum to the resulting crystalline solution obtained in step c), stirring for 2 to 8 hours, where said acetate is magnesium, titanium, zinc, zirconium or gallium acetate;
   e) adding an organic or inorganic porosity promoter to the homogenized solution obtained in step d), while agitation is maintained until homogenized;
   f) adding a binder is added to the homogenized solution obtained in step e), where said binder is clay, kaolin or metal oxide having the formula MxOy, where:
   M=Al, Mg, Sr, Zr or Ti, x=1 or 2 and y=2 or 3, maintaining agitation until homogenization and subsequent aging and drying of the paste; and
   g) extruding the resulting paste obtained in step f); drying the extrudates at room temperature for 16 to 20 hours; then fragmenting the extrudates to 3 to 4 cm in length; dried at 100-140° C. for 2 to 4 hours and calcined at 250-500° C. for 2 to 4 hours; and finally crushed and sifted.

8. The process for obtaining the heterogeneous acid catalysts according to claim 7, wherein
   the water used in step a) is deionized water.

9. The process for obtaining the heterogeneous acid catalysts according to claim 7, wherein
the oxygenated or oxygen-containing solvent used in step a) is tetrahydrofuran, diethyl ether or dimethoxyethane.

10. The process for obtaining the heterogeneous acid catalysts according to claim 9, wherein
the tetrahydrofuran is anhydrous tetrahydrofuran (THF).

11. The process for obtaining the heterogeneous acid catalysts according to claim 7, wherein
the addition of said water and oxygenated or oxygen-containing solvent in step a) is a prepared mixture in a volume ratio of 5:1 to 1:5, and added at a rate of 1 drop per second.

12. The process for obtaining the heterogeneous acid catalysts according to claim 7, wherein
the volume ratio of water to the aluminum lithium hydride added in step a) is from 3 to 20 parts of water per mole of aluminum lithium hydride.

13. The process for obtaining the heterogeneous acid catalysts according to claim 7, wherein
the inert atmosphere in step a) is generated using gaseous nitrogen ($N_2$), argon or helium.

14. The process for obtaining the heterogeneous acid catalysts according to claim 7, wherein
the temperature used in step a) is 0 to 5° C.

15. The process for obtaining the heterogeneous acid catalysts according to claim 7, wherein
the corresponding acid in step b) is added at a rate of 1 drop per second.

16. The process for obtaining the heterogeneous acid catalysts according to claim 7, wherein
the acetate solution added in step d), is prepared just prior to the addition is obtained by: reacting isopropoxide or ethoxide with glacial acetic acid while stirring for 2 to 6 hours.

17. The process for obtaining the heterogeneous acid catalysts according to claim 7, wherein
the acetates in step d) are magnesium acetate or titanium acetate.

18. The process for obtaining the heterogeneous acid catalysts according to claim 7, wherein
the agitation in step d) to homogenize is maintained for 2 to 3 hours.

19. The process for obtaining the heterogeneous acid catalysts according to claim 7, wherein
the porosity promoter in step e) is an amylose-amylopectin starch.

20. The process for obtaining the heterogeneous acid catalysts according to claim 7, wherein
the binder in step f) is montmorillonite, kaolin, silica or alumina.

21. The process for obtaining the heterogeneous acid catalysts according to claim 7, wherein
the mixed metal salts in addition to their combinations with preferably the metal cations are selected from the group consisting of:
Phosphates and sulfates of lithium and aluminum,
Phosphates and sulfates of lithium, aluminium and titanium,
Phosphates and sulfates of lithium, aluminum and magnesium.

22. The process for obtaining the heterogeneous acid catalysts accordingly to claim 7, wherein
the process for the preparation of lithium and aluminum phosphates and sulfates does not comprise step d), and where said organic or inorganic porosity promoter is added to the solution of step c), followed by steps f) and g).

* * * * *